UNITED STATES PATENT OFFICE.

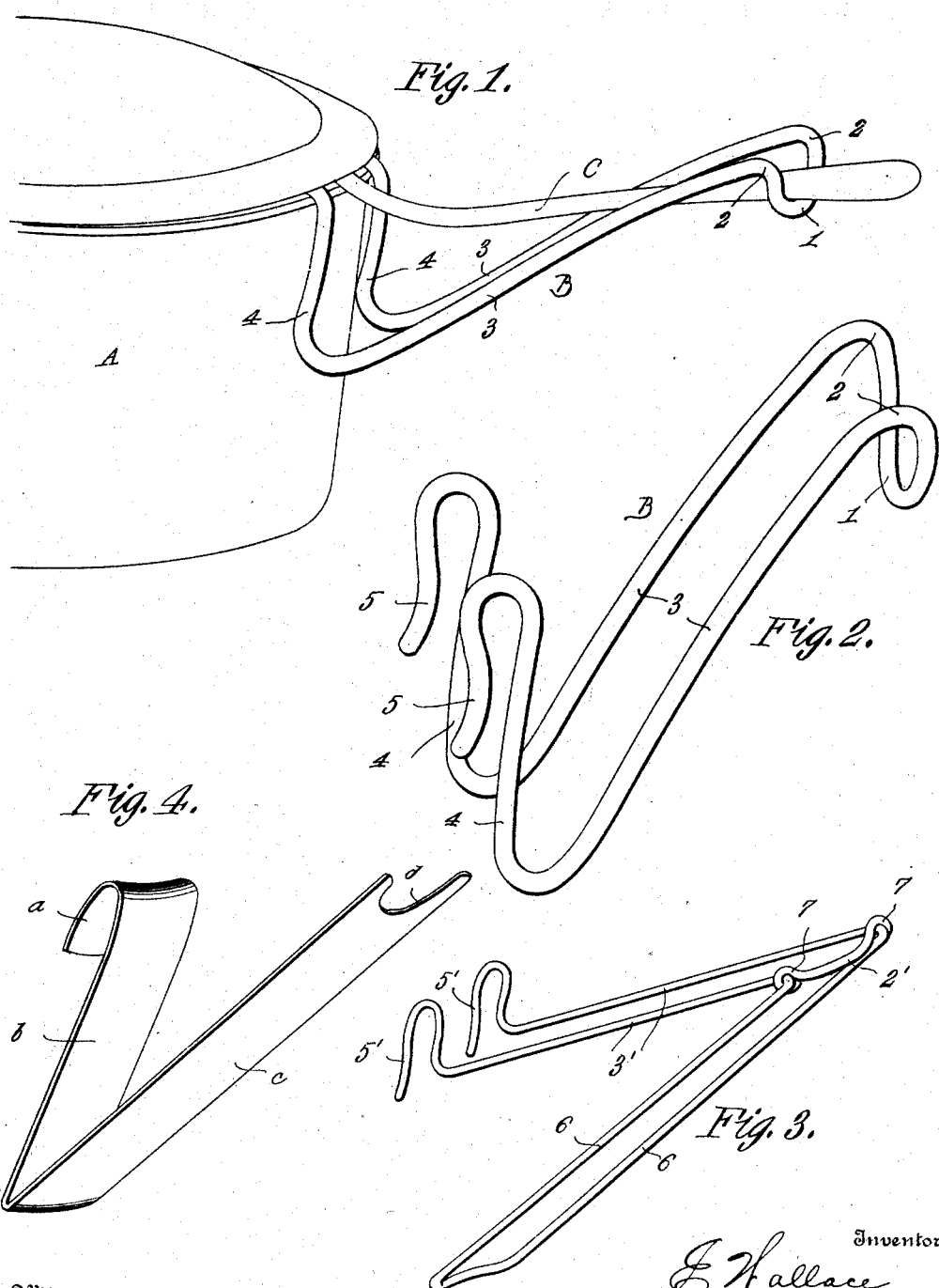

EDITH WALLACE, OF NEW YORK, N. Y.

SPOON-REST.

No. 927,088.      Specification of Letters Patent.      Patented July 6, 1909.

Application filed April 28, 1909. Serial No. 492,730.

*To all whom it may concern:*

Be it known that I, EDITH WALLACE, a citizen of the United States, residing at Bronx, New York city, in the county of New York and State of New York, have invented certain new and useful Improvements in Spoon-Rests, of which the following is a specification.

The present invention consists of a novel form of attachment for cooking vessels designed as a support for spoons used to stir the contents of the vessel while cooking.

In devising the present attachment the special object in view has been to provide an article which is so simple in construction that it can be manufactured in large quantities at a nominal cost, and yet which possesses certain advantages from the standpoint of construction and use of peculiar merit, and which will be pointed out more fully hereinafter.

For a full understanding of the invention, reference is to be had to the following detail description and to the accompanying drawings, in which—

Figure 1 is a perspective view of a portion of a cooking vessel and illustrating the invention applied thereto; Fig. 2 is a detail perspective view of the spoon holding attachment alone; Fig. 3 is a perspective view of a modification of the invention, and Fig. 4 is a perspective view of another modification of the invention in which the same is constructed of sheet metal.

Throughout the following detail description, and on the several figures of the drawings similar parts are referred to by like reference characters.

Referring to the drawings and especially to the construction of the invention illustrated in Figs. 1 and 2 the letter A denotes the cooking vessel and the letter B the attachment for supporting the spoon in a position in which it is always ready to be handled in order to facilitate the cooking operation.

The attachment is preferably made of a single length of wire bent intermediate of its ends to provide a rest 1 for the outer end portion of the handle of the spoon C, the end portions of the wire adjacent to the rest 1 being bent upwardly as shown at 2 and thence downwardly to form the inclined spaced sides of the attachment designated 3. The sides 3 of the attachment are then bent upwardly as at 4 and finally bent downwardly to provide the hooks 5 which are arranged substantially parallel with the side portions of the attachment. The hooks 5 are located at a slightly lower elevation than the rest 1 so that the spoon C when supported by the attachment will incline slightly permitting its drippings to pass into the vessel. In actual use the hooks 5 are engaged over a side of the cooking vessel A and beneath the lid thereof, the outer portions of the hooks resting in contact with the outer side of the vessel. The spoon is placed between the hooks 5 with its bowl arranged beneath the lid and the handle of the spoon extends outwardly between the sides 3 of the attachment so that its outer end rests on the part 1.

The attachment may be made of spring wire in which event the hooks 5 will have a spring engagement with the side of the cooking vessel A, this most effectively supporting the attachment in operative position.

The invention as above described is extremely simple in its construction and permits of an arrangement of the spoon whereby the handle is always away from the contents of the cooking vessel and cool, avoiding liability of burning the hands in the manipulation of the spoon. Furthermore, the handle can be grasped very quickly in case of emergency, the arrangement of the attachment not interfering in any way with the lid other than perhaps to slightly elevate the same from the vessel A which is desirable to prevent boiling over of the contents of the vessel.

The modification of the invention illustrated in Fig. 3 is very similar to that shown in Fig. 1 excepting that the article is made from two pieces of wire. In Fig. 3 the hooks are denoted 5′, the sides 3′, and the rest 2′. The sides 3′ are bent downwardly to form a brace 6, the latter being of somewhat U-form and adapted at its lower end to rest against the outside of the cooking vessel. Under certain conditions the form of the invention shown in Fig. 3 may be found desirable for use.

Fig. 4 illustrates an exceedingly simple and advantageous embodiment of the invention in which the device is constructed entirely of sheet metal. In this form of the invention a narrow strip of sheet metal is bent at one end to form a hook $a$ and thence extended downwardly to provide a rest $b$ for engagement with the side of the vessel, the metal being then bent upwardly to form the arm c, the upper end of which is cut away to provide the rest d.

In their general constructions it is obvious that the devices described in all of the figures of the drawings comprise supporting attachments each of which consists of a hook part which extends downwardly to rest against a side of the cooking vessel and thence projects upwardly to provide an arm extending outwardly from the cooking vessel, and said arm having at its outermost portion a rest between the side of which the handle of the spoon is adapted to be supported.

It is to be noted that the outer portion of the attachment comprising the invention and which constitutes an off-standing arm, extends substantially at an acute angle to the supporting hook of the device. This formation of the attachment is advantageous in that the angular space between the outer portion of the attachment and the hook permits of readily grasping the spoon and without burning the fingers as might be likely in the event the attachment is hot from being carried by the cooking vessel. Substantially the whole portion of the handle of the spoon is between the outer rest of the attachment and the hook, and said handle will not thus become heated and this is particularly advantageous in a device of this class.

Having thus described the invention, what is claimed as new is:

As a new article of manufacture, a spoon-holding attachment for vessels made from a single length of wire, opposite end portions of which are bent to form vertically arranged hooks, the wire being bent at a point about centrally between its ends to provide spaced side members inclined upwardly from the lower ends of the hooks at substantially an acute angle, whereby to provide an open space between the top portions of the hooks and the remote outer portion of the attachment to facilitate grasping a spoon resting thereon, said remote outer portion of the attachment being bent downwardly to provide a rest for the spoon handle and which is arranged in a plane below that of the uppermost portions of the side members.

In testimony whereof I affix my signature in presence of two witnesses.

EDITH WALLACE.

Witnesses:
M. L. WALLACE,
L. A. WARD.